Figure 1:
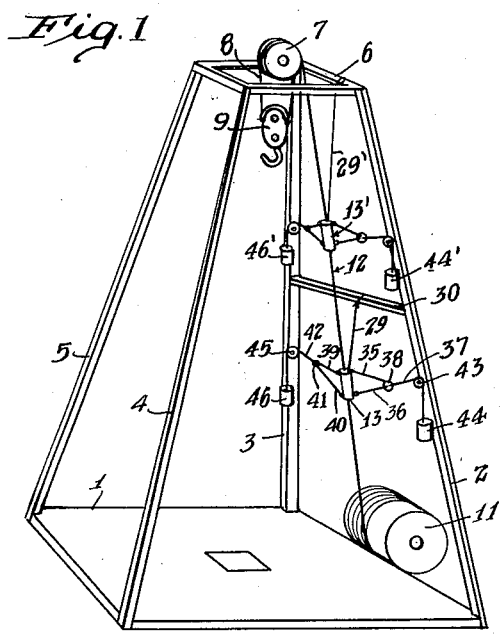

April 15, 1941.  J. E. REED  2,238,398
LINE SPOOLER
Filed May 22, 1937

Inventor
John E. Reed
By Lyon & Lyon
Attorneys

Patented Apr. 15, 1941

2,238,398

UNITED STATES PATENT OFFICE 2,238,398

LINE SPOOLER

John E. Reed, Beldridge, Calif.

Application May 22, 1937, Serial No. 144,158

3 Claims. (Cl. 254—190)

My invention relates to line spoolers and has particular reference to a device for engaging a line to be wound up or spooled up upon a drum for the purpose of preventing whipping or oscillation of the line from being transmitted along the line and disarranging its proper seating in spooled arrangement upon the drum.

In hoisting apparatus, wherein the hoisting cable is wound up upon a drum, considerable difficulty is encountered in making the line wind neatly upon the drum with the adjacent coils of the line disposed closely adjacent each other, as is the desired practice in spooling such line upon the drum.

In installations wherein a relatively long span of line lies between the drum and the next adjacent pulley over which the line lies, considerable vibratory motion takes place in the line within this span and the said vibration whips the line to such extent that it frequently causes it to pile up upon itself as it is coiled up upon the drum. Such vibratory motions are essentially wave motions which proceed up and down the span of the line or cable and unless these wave motions are damped or eliminated the line will not wind properly or be "spooled" properly upon the winding drum.

For example, in oil well installations the winding drum is located on the floor of the derrick and the line to be wound upon the drum extends in one single free span to the top of the derrick, where it passes over the crown block. The height of the derrick may, and usually does, exceed 100 feet so that the unrestricted span of line or cable from the crown block to the winding drum is frequently from 100 to 120 feet in length. When the drum is operated to wind the line with considerable rapidity the wave motions or "whipping" produced in this span of the line frequently attains such proportions as to whip the line entirely away from any possibility of neat spooling or close coiling upon the drum. Various expedients have been tried to guide the line upon the drum to avoid difficulties encountered as a result of this wave motion, such devices including passing the line through a relatively large chain link which is disposed adjacent the drum or a spooling guide is located near the drum and actuated mechanically longitudinally with respect to the drum so as to guide the cable into neat spooling arrangement upon the drum.

Such devices, however, fail to perform the desired function because of the numerous amounts of knots which are encountered in the whipping of the line and the passing of the waves beyond the guiding mechanisms to such degree that the line fails to properly wind upon the drum.

I have discovered that if guiding mechanisms of considerable weight, and hence of considerable inertia are mounted along the length of the span at predetermined points therealong the wave motions may be interrupted or damped to such degree that their effect becomes negligible.

It is, therefore, an object of my invention to provide a guide for a long span of cable having considerable weight and preferably having a length so proportioned to the length of the span as to exceed the normal length of a wave or whip which will be produced in the line and thus damp the wave motion and prevent it from being transmitted throughout the length of the span.

Another object of the invention is to provide a guide mechanism which has considerable capacity and considerable length through which the line may pass, such device being disposed at one or more points along the span of the line to interrupt or damp the wave motion proceeding along the line at one or more points.

Another object of the invention is to provide a device of the character set forth in the preceding paragraphs, wherein the guide is lined with material which will not appreciably wear the line.

Another object of the invention is to provide a device of the character set forth, in which a pair of complementary housing members defining a cylindrical opening of considerable length may be secured together and grip between them a plurality of separate guide inserts through which the line or cable may run, the housing members being provided with devices by which the housing members may be swung for free movement in a direction parallel with the longitudinal axis of the drum to follow the motion of the cable as it is wound or spooled upon the drum.

Another object of the invention is to provide a device of the character set forth in the preceding paragraph, wherein the inserts are in the form of short cylindrical blocks of suitable material, split to permit their ready disposition about the cable.

Another object of the invention is to provide an insert of the character set forth in the preceding paragraph, which may be constructed of rubber or similar material adapted to retain lubricant for reducing friction between the inserts or lining members and the cable.

Figure 3:
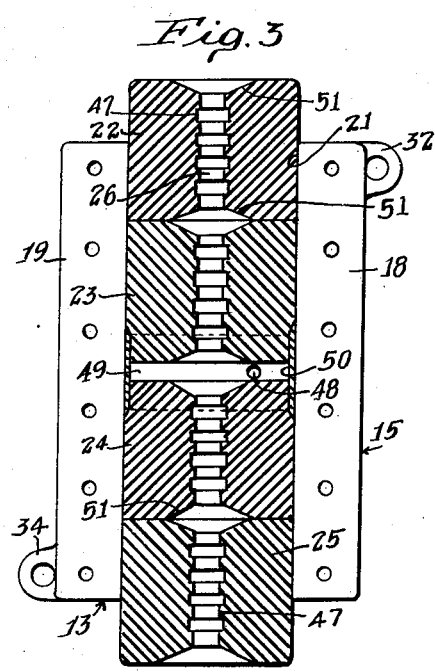
Figure 2:
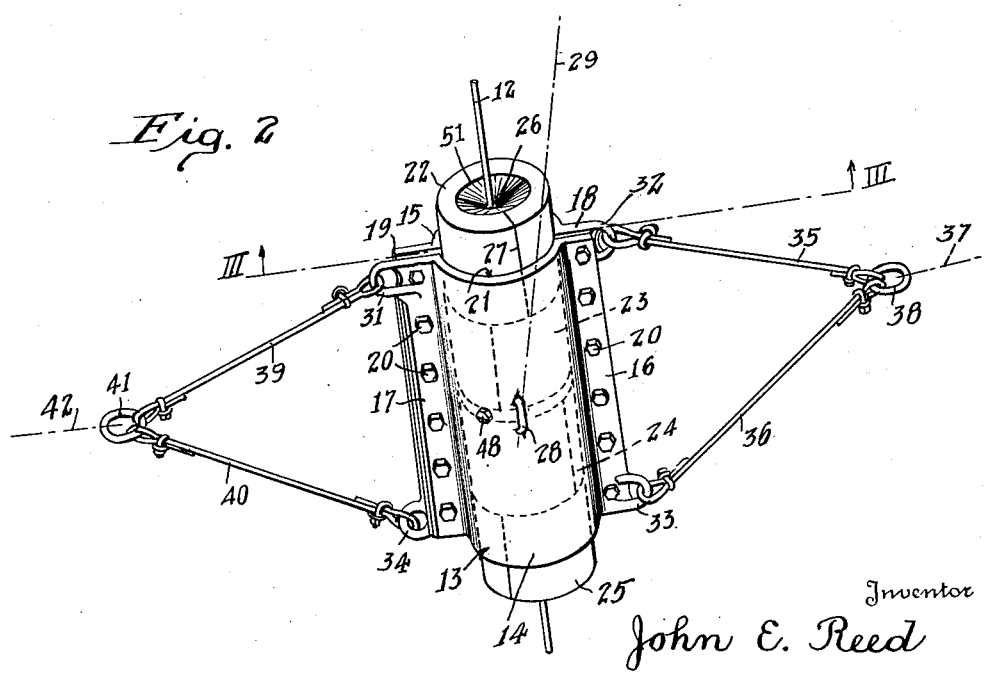

Other objects and advantages may be apparent from a study of the following specification, read in connection with the accompanying drawing, wherein Fig. 1 is a diagrammatic view of an oil well derrick and a cable system, illustrating the manner in which my line spooler or guide may be mounted upon a long span of cable;

Fig. 2 is an enlarged perspective view of one of the line spoolers or guides constructed in accordance with my invention; and Fig. 3 is a vertical sectional view taken along line III—III of Fig. 2.

Referring to the drawing, I have illustrated, in Fig. 1, an oil well derrick which includes a derrick floor 1 from which rises corner uprights 2, 3, 4 and 5, upon the upper ends of which is mounted a derrick head or crown 6. In the head or crown 6 is mounted a crown block 7 which, as will be understood by those skilled in the art, may consist of a plurality of pulleys, over which the hoisting cable 8 may pass, the cable being trained over the crown block 7 and over a traveling block 9, the winding end of the cable being secured to a winding drum 11, supported upon the derrick floor and operated by a suitable winding engine, not shown. Oil well derricks are usually of considerable height, usually in excess of 100 feet, so that for purposes of illustration herein, we may assume that the distance between the winding drum 11 and the crown block 7 is approximately 120 feet so that the span 12 of the cable is approximately 120 feet in length. It will be apparent that with a span of cable of this length any rapid rotation of the winding drum 11 will cause considerable vibration or wave motion to be produced in the cable, causing successive waves to travel up and down the span, these waves, due to the weight of the cable and the rapidity of the winding motion of the drum, causing a lateral motion of the cable of considerable extent sufficient to frequently cause the cable to "jump" upon the drum, and to prevent its normal winding up neatly or being "spooled" neatly upon the drum.

In order to damp or destroy these waves in the span 12 of the cable, I provide a guide or "spooler" 13 to engage the cable a considerable distance away from the drum 11, the spooler being of such length as to substantially exceed the length of one of the waves, or at least to be of such length as to prevent the free transmission of the wave motion through the spooler. For example, in the assumed illustration herein the spooler 13 may be approximately 3 feet in length.

By referring particularly to Figs. 2 and 3, it will be noted that the line spooler may be simply constructed as by providing a pair of complementary housing members 14 and 15, each of these members being in effect a semi-cylindrical section of metal upon opposed radial edges of which extend a longitudinal flange; the section 14, having flanges 16 and 17 formed thereon, while the section 15 has flanges 18 and 19 thereon, these flanges being employed to receive bolts 20 by which the housing sections 14 and 15 may be clamped or secured together.

When the housing members are secured together by their bolts 20 a longitudinally extending bore will be defined within the housing members. The bore 21 is preferably of relatively large diameter with respect to the line or cable 8. For example, the bore may be 6 inches in diameter, while the cable seldom exceeds ¾ inch in diameter.

Mounted within the bore 21 is a plurality of inserts or liners 22, 23, 24 and 25, each of these liners being preferably constructed of relatively stiff rubber, cylindrical in shape, and having a central longitudinal bore 26 extending therethrough of a diameter slightly in excess of the diameter of the cable 8. By employing a plurality of liners 22, 23, 24 and 25 I may line the entire interior of the bore 21 so as to provide a substantially uninterrupted small diameter bore 26 through which the cable 8 may pass.

To facilitate the mounting of my spooler 13 upon the cable 8, I prefer to form the liners 22, 23, 24 and 25 with a longitudinal cut or split 27 extending from the exterior thereof to the interior bore 26 so that the liner section or insert may be spread at the split 27 and placed upon the cable. Or, in other words, the cable may pass through the split 27 to be received in the bore 26. In mounting my line spooler upon a cable, a number of liners or inserts 22, 23, 24 and 25 may be placed upon the cable and then the complementary housing sections 14 and 15 may be placed around the liners and bolted or clamped together by means of the bolts 20, the housing sections 14 and 15 when clamped together securely clamping each of the liners in place within the housing and preventing any longitudinal displacement of the liners with respect to the housing.

At least one of the housing sections 14 or 15 is provided with an eye or ear 28, preferably located centrally with respect to the length of the housing member, the ear 28 receiving one end of a supporting cable 29 (see Fig. 1) by which the spooler may be freely suspended from the derrick. As will be hereinafter more fully described, it is necessary that the cable 8 be permitted considerable latitude of motion in the direction of the longitudinal axis of the winding drum 11 so that the line of cable may be wound in a series of coils or a helix along the face of the drum 11, and hence the guide or spooler constructed in accordance with my invention must be adapted to allow free movement of the cable in this direction. For this purpose I prefer to suspend my spooler or guide 13 upon a relatively long length of cable 29, in the assumed example described herein the spooler 13 being preferably suspended approximately 40 feet upon the winding drum 11 upon a cable 29 which is preferably approximately 40 feet in length. That is, the upper end of the cable 29 will be mounted or secured upon a cross strut 30 of the derrick construction at a height approximately 80 feet above the floor 1 of the derrick. By suspending the spooler at its approximate longitudinal center, it will be apparent that the spooler will hang freely with its longitudinal axis disposed in substantial alignment with the direction of the extent of the span 12 of the cable 8, and will not require a bend or offset of the cable 8 as it passes through the spooler 13, while, if the spooler 13 is made of considerable weight and has considerable inertia, it will damp or tend to destroy the waves or wave motion of the span 12 of the cable, even though it is freely suspended entirely by the cable 29. However, I prefer to restrain the free motion of the spooler 13 in all directions, though it must be understood that some motion must be permitted the spooler to prevent undue friction upon the cable. In other words sufficient motion must be allowed to permit the longitudinal axis of the spooler to be aligned with the direction of movement of the cable, even though the cable itself may move out of a single direct line. This restraining of the motion of the line spooler may be readily accomplished by providing guys upon each side of the spooler 13, as by providing radially extending ears 31, 32, 33 and 34 upon the housing members 14 and 15, and connecting a Y cable to the ears on each side of the spooler. For example, at one side of the spooler a Y cable, including a section 35 and a section 36 may be coupled to a leg cable 37 by means of a ring 38, the outer ends of the Y cable section 35 being connected to the ear 32 near the top of the line spooler, while the outer end of the cable 36 is connected to the ear 33 on the same side of the line spooler, but near the lower end thereof.

Similarly, the Y cable on the opposite side of the line spooler may have its sections 39 and 40 connected through a ring 41 to a leg section 42, the outer end of the section 39 being connected to the ear 31 near the top of the line spooler and the outer end of the section 40 being connected to the ear 34 at the same side, or at the lower end of the line spooler. The leg sections 37 may be disposed over a pulley 43, preferably mounted upon the corner post 2 of the derrick, and may have upon its lower end a counterweight 44 of any desired weight. Likewise, the leg section 42 may pass over a pulley 45 mounted upon the opposed corner post 3 of the derrick and may be provided with a counterweight 46. The counterweights 44 and 46 are preferably of the same weight so that as the cable swings longitudinally of the drum 11, the line spooler 13 may move therewith but due to the inertia of the counterweights 44 and 46 such motion will be retarded, at least to the extent that the line spooler 13 will not readily respond to the wave motion of the cable span 12. Likewise the inertia of the line spooler 13 and its counterweights 44 and 46 will prevent the line spooler from readily moving in a transverse direction under the influence of the wave motion of the cable span 12.

While in many instances a single line spooler, disposed approximately 40 feet above the winding drum 11 will be effective to destroy or damp the wave motion of the cable span 12, I prefer to employ a second line spooler 13' which may be identical in construction to the spooler 13, but which is preferably suspended upon a cable 29' from the crown 6 of the derrick. That is, the cable 29' would be approximately 40 feet long, suspending the line spooler 13 40 feet below the crown 6 and approxicately 40 feet above the spooler 13. Again the spooler 13' should be provided with counterweights 44' and 46' passing over suitable pulleys at the corner posts 2 and 3 to allow retarded movement of the line spooler but maintain it in alignment with the cable 8.

For convenience and simplicity in the manufacture of the line spooler, I prefer that the complementary housing sections 14 and 15 be identical, and hence interchangeable. The housing section 14 may therefore be constructed with the eye 31 located at its upper left-hand corner and the eye 33 at its lower right-hand corner, while similarly the housing section 15 is provided with its eye 32 in the upper right-hand corner and the eye 34 in its lower left-hand corner (when this housing section is viewed from the same direction as housing section 14). Likewise, the eye or ear 28 on the housing section 14 is duplicated by a similar eye or ear upon the housing section 15. This construction also facilitates the handling of the housing sections as they are assembled together and upon the inserts 22, 23, 24 and 25 since both housing sections are at all times supported by the cables 35—36—37 and 39—40—42 and the danger of dropping one of such sections is thus obviated.

As will be understood by those skilled in this art, the hoisting cable 8 is normally lubricated with a tar-like lubricant, that is one which contains little or no volatile oils, and such lubricant will not materially affect or deteriorate the rubber of which the liners 22, 23, 24 and 25 are constructed. Moreover, by forming a plurality of the corrugations or grooves 47 along the central bore 26 of the liner sections, pockets are formed along this bore in which lubricant may accumulate and be distributed along the cable as it passes through my spooler. In fact the spooler may be employed as a means for maintaining lubricant upon the cable 8 as by providing a lubricant fitting 48 upon both of the housing sections 14 and 15, preferably near the longitudinal center thereof through which lubricant may be injected into the interior of the housing. When this method of lubricating the cable is employed, I prefer to provide a space 49 (see Fig. 3) between the centermost lining sections 23 and 24 through which lubricant may be passed to the central bore 26. A gasket 50 would of course be provided around the exterior of the lining sections 23—24 to prevent escape of the lubricant at the junction of the flange of the housing members, such gasket being preferably made of thin rubber or similar sheet material.

In order to reduce the friction between the cable and the liners 22, 23, 24 and 25, I prefer to bevel the upper and lower surfaces of each of the liners 22, 23, 24 and 25 toward the bore 26, as indicated at 51, the tapered portions 51 of the adjacent lining sections 22, 23, 24 and 25 constituting an additional pocket into which lubricant may be received.

It will also be noted that by forming the liner in sections, as indicated at 22, 23, 24 and 25, the housing sections 14 and 15 may be loosened and one or more of the individual sections may be removed as it is worn and replaced by a new liner section, or, as usually occurs, the liner may become worn more upon one side than upon the other, and it may be merely turned to present a new wearing surface to the cable.

While I have shown and described the preferred embodiment of my invention, I do not desire to be limited to any of the details of construction shown herein, except as defined in the appended claims.

I claim:

1. In a guide for damping vibrations of a traveling cable, a housing comprising a pair of complementary semi-clindrical housing members, means for securing said members together to define a central longitudinal passage through said housing, lining means comprising a plurality of abutting cylindrical rubber sections, seated within and clamped within said passage in said housing, each of said lining sections having a longitudinal concentric bore extending therethrough through which said cable passes.

2. In a guide for damping vibrations in a long span of traveling cable, a housing member including a pair of complementary semi-cylindrical elongated housing members, each having longitudinally extending flanges thereon, by which said members may be assembled together, lining means for said housing defining a restricted longitudinal bore through said guide, through which said cable may freely travel, means on at least one of said housing members near the longitudinal center thereof by which said guide may be suspended for substantially free lateral movement with respect to the direction of travel of said cable, and guy means associated with said housing for restricting the lateral movement of said guide.

3. A cable guide liner comprising a substantially cylindrical liner member having a central concentric bore therethrough slightly in excess of the diameter of the cable with which it is to be associated, the member having walls surrounding said bore of greater width than the diameter of said bore and having a length considerably exceeding the diameter and being formed of relatively stiff rubber, said member having a longitudinal slit for the insertion of the cable.

JOHN E. REED.